US006111892A

United States Patent [19]
Rittle et al.

[11] Patent Number: 6,111,892
[45] Date of Patent: Aug. 29, 2000

[54] METHOD AND APPARATUS FOR CONVEYING DATA PACKETS IN A COMMUNICATION SYSTEM WITHOUT USING COMMUNICATION DEVICE TIMERS TO TRIGGER DATA RETRANSMISSION

[75] Inventors: Loren J. Rittle, Naperville; Stephen S. Gilbert, Lake Zurich, both of Ill.

[73] Assignee: Motorola, Inc., Schaumburg, Ill.

[21] Appl. No.: 09/124,275

[22] Filed: Jul. 29, 1998

[51] Int. Cl.[7] .................................................. H04L 12/56
[52] U.S. Cl. .......................................... 370/465; 370/477
[58] Field of Search .................................. 370/236, 242, 370/384, 410, 465, 477; 714/18

[56] References Cited

U.S. PATENT DOCUMENTS

| | | | |
|---|---|---|---|
| 5,570,367 | 10/1996 | Ayanoglu et al. | 370/346 |
| 5,627,970 | 5/1997 | Keshav | 370/236 |
| 5,664,091 | 9/1997 | Keen | 714/18 |
| 5,677,918 | 10/1997 | Tran | 370/321 |
| 5,754,754 | 5/1998 | Dudley et al. | 714/18 |
| 5,818,852 | 10/1998 | Kapoor | 714/749 |
| 5,963,551 | 10/1999 | Minko | 370/356 |

*Primary Examiner*—Min Jung
*Attorney, Agent, or Firm*—Jeffrey K. Jacobs

[57] ABSTRACT

A communication device (106) transmits a data packet at a first transmission time or during a first transmission time period to a data controller (116). The data controller determines an earliest transmission time or time period of data packets to be acknowledged and transmits an indication that only data packets transmitted after the earliest transmission time or time period will be acknowledged. The communication device then determines whether the data controller is indicating that only data packets transmitted after the first transmission time or time period will be acknowledged. When the data controller is indicating that only data packets transmitted after the first transmission time or time period will be acknowledged, the communication device retransmits at least a portion of the data packet and thereby performs timerless error recovery.

19 Claims, 4 Drawing Sheets

METHOD AND APPARATUS FOR CONVEYING DATA PACKETS IN A COMMUNICATION SYSTEM WITHOUT USING COMMUNICATION DEVICE TIMERS TO TRIGGER DATA RETRANSMISSION

FIELD OF THE INVENTION

The present invention relates generally to communication systems and, in particular, to conveying data packets between a communication device and a data controller in a communication system.

BACKGROUND OF THE INVENTION

Many protocols exist for reliably conveying data packets from one communication device to another via unreliable communication channels. In some such protocols (such as, automatic repeat request (ARQ) protocols), a sending device transmits data packets to a target device and, upon receiving the data packets, the target device transmits corresponding acknowledgment (ACK) messages back to the sending device. Typically, the sending device will set a timer upon transmitting a data packet or group of data packets. Unless an ACK is received for a particular data packet or group of data packets before the corresponding timer expires, the data packet or group of data packets is retransmitted. Thus, reliable data transfer is achieved.

In timer-based protocols, the time-out period can affect data transfer characteristics, such as data throughput and delay. For example, when the time-out period is too short, a sending device will retransmit data packets prematurely. A target device may be about to transmit an ACK for a particular data packet. But, if a timer corresponding to the data packet expires in the sending device before the ACK is actually received by the sending device, the data packet is retransmitted by the sending device, notwithstanding the fact that the data packet was received by the target device. Because the time-out period used did not allow the target device to receive, process, and acknowledge the data packet before the timer expired, the data packet was not only unnecessarily retransmitted, but also unnecessarily received. Such unnecessary retransmissions inefficiently utilize the communication resources shared by the sending and target devices and, thereby, reduce potential data throughput.

On the other hand, when the time-out period is too long, data packets that need to be retransmitted are unnecessarily delayed. Retransmission delay increases the overall data transfer delay and can lead to reduced data throughput. For example, the target device may need to buffer received data while waiting for retransmissions of missing data. When such buffers fill, data transfer is effectively halted until some of the retransmitted data packets are received. Thus, the data throughput is reduced.

Therefore, a time-out period which is no longer than the time needed for round-trip link travel and target device processing is optimal. When only one communication device is sending data to another communication device (one-to-one communication), the optimal time-out period is relatively easy to determine. However, when many communication devices are sending data to a single communication device via a shared communication resource (many-to-one communication), the optimal time-out period is much more difficult to determine.

The time between transmitting a particular data packet and receiving a corresponding ACK (ACK turn-around time) may vary considerably in many-to-one communications. A period of time in which few of the sending devices are transmitting data may be followed by a period of time in which many of the sending devices are transmitting data. Typically, when many sending devices are transmitting data to one target device, the queuing for transmission of the corresponding ACKs results in greater delays than when only a few sending devices are transmitting data. As the data traffic varies, the queuing delays experienced by untransmitted ACKs vary and, therefore, ACK turn-around times vary. In one-to-one communications, the ACK turn-around time may vary as the sending device intermittently transmits data. But, with the much greater traffic fluctuations of many-to-one communications, the variability of the ACK turn-around time is amplified.

Such fluctuations in ACK turn-around time make determining an optimal time-out period much more difficult for many-to-one communications. If the time-out period is set relatively long to account for periods of heavy traffic, added delay and lower throughput will likely result. If the time-out period is instead set relatively short to accommodate normal traffic levels, many premature retransmissions will occur during periods of heavy traffic and data throughput will suffer. The greater the fluctuation in ACK turn-around time, the less adequate any particular time-out period will be. Thus, timer-based protocols are not as well suited for many-to-one communications as they are for one-to-one communications.

Therefore, a need exists for a method and apparatus of conveying data packets reliably that overcomes the inadequacies of timer-based methods in many-to-one communications.

DESCRIPTION OF A PREFERRED EMBODIMENT

Generally, the present invention provides a method and apparatus for conveying data packets in a communication system. A communication device transmits a data packet at a first transmission time or during a first transmission time period to a data controller. The data controller determines an earliest transmission time or time period of data packets to be acknowledged and transmits an indication that only data packets transmitted after the earliest transmission time or time period will be acknowledged. The communication device then determines whether the data controller is indicating that only data packets transmitted after the first transmission time or time period will be acknowledged (i.e., whether the data controller is indicating that the data packet sent by the communication device will no longer be acknowledged). When the data controller is indicating that only data packets transmitted after the first transmission time or time period will be acknowledged and the communication device has not yet received an acknowledgment for the data packet, the communication device retransmits at least a portion of the data packet.

By conveying data packets in this manner, the present invention eliminates the need for retransmission timers in the sending communication devices. By eliminating such timers, the throughput and delay problems of timer-based protocols, particularly when many communication devices are communicating with one data controller, can be avoided.

Figure 1:
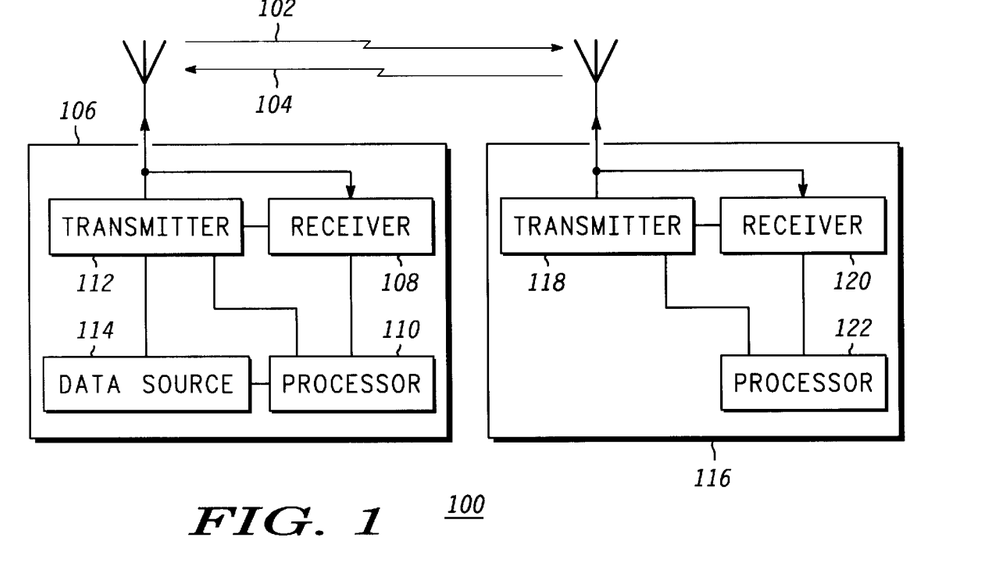
FIG. 1 illustrates a block diagram depiction of a communication system in accordance with a preferred embodiment of the present invention.

The present invention can be more fully understood with reference to FIGS. 1–5. FIG. 1 illustrates a block diagram depiction of a communication system 100 that includes a communication device 106 and a data controller 116 in accordance with a preferred embodiment of the present invention. The communication device 106 comprises a data source 114, a transmitter 112, a receiver 108, and a processor 110. The data controller 116 comprises a transmitter 118, a receiver 120, and a processor 122. Each transmitter 112, 118 preferably comprises well-known circuitry, such as amplifiers, modulators, upconverters, and filters. Each receiver 108, 120 preferably comprises well-known circuitry, such as amplifiers, demodulators, down-converters, and filters. Each processor 110, 122 preferably comprises a microprocessor. The data source 114 is the source of data packets to be transmitted to the data controller 116 and preferably comprises a random access memory coupled to a data entry device (not shown), such as a personal computer. The communication device 106 preferably comprises a mobile or portable radio, radiotelephone, or wireless data terminal. The data controller 116 preferably comprises a "Motorola" Data Gateway (MDG) that is commercially available from Motorola, Inc. of Schaumburg, Ill.

Operation of the preferred communication system 100 occurs substantially as follows in accordance with the present invention. The data source 114 of the communication device 106 provides data packets to transmitter 112 for transmission to data controller 116. Each data packet preferably comprises control information and user data, such as a portion of a text file or data file. Typically the control information is confined to the data packet header, although a data packet might contain a mixture of control information and data or control information exclusively.

The communication device transmitter 112 transmits a first data packet during a first transmission time period to the data controller 116 via a radio communication resource 102. The first transmission time period is the time interval or generation in which the first data packet was transmitted to the data controller 116. In the preferred embodiment, the communication system 100 comprises a time division multiple access (TDMA) communication system, such as the "iDEN" system that is commercially available from Motorola, Inc. Accordingly, the radio communication resource 102 preferably comprises one or more TDMA time slots. In an alternative embodiment, the communication system 100 might comprise a code division multiple access (CDMA) or frequency division multiple access (FDMA) system.

The receiver 120 of the data controller 116 receives the first data packet from the communication device 106. The data controller's processor 122 periodically determines the earliest transmission time period or generation of received data packets to be acknowledged. The processor 122 generates ACKs for the received data packets transmitted during the earliest generation and provides the ACKs and a control signal to the transmitter 118. The control signal instructs the transmitter 118 to transmit an indication that only data packets transmitted after the earliest generation will be acknowledged.

In response to the control signal, the transmitter 118 transmits the indication via a radio communication resource 104. The indication comprises a sequence of control information values, where each control information value preferably resides in a portion of a TDMA time slot. In a preferred embodiment, each control information value is one or more bits that represent the generation of transmitted data packets currently being acknowledged by the data controller 116. The bits reside in a portion of the so-called packet data slot descriptor blocks (SDBs) transmitted by the data controller 116 in each downlink (data controller-to-communication device) TDMA time slot. The SDB is the portion of the downlink time slot containing control information indicating the type (e.g., packet data or voice) of the corresponding uplink (communication device-to-data controller) time slot. As the generation of transmitted data packets currently being acknowledged changes, the bit or bits representing each generation change and form a sequence of control information values over time.

The receiver 108 of the communication device 106 receives the sequence of control information values indicating that only data packets transmitted after the earliest generation will be acknowledged. The communication device processor 110 then determines based on the sequence of control information values whether the first generation (i.e., the time period in which the first data packet was transmitted) was after the earliest generation. When the data controller 116 is indicating that data packets transmitted during the first generation will no longer be acknowledged and the communication device receiver 108 has not received an acknowledgment of the first data packet, the communication device processor 110 provides a control signal to the communication device transmitter 112. The control signal instructs the communication device transmitter 112 to retransmit at least a portion of the first data packet to the data controller 116. In response to the control signal, the communication device transmitter 112 preferably retransmits the user data portion of the first data packet and any of the control portion which is unchanged for the retransmission.

By retransmitting data packets based on indications from a data controller as discussed above, rather than ba sed on timer expirations in the communication device as in the prior art, the present invention achieves reliable data transfer, while avoiding some of the pitfalls inherent to timer-based protocols. Because the data controller, after transmitting ACKs for data packets transmitted at or before a particular time or time period, indicates that such ACKs will no longer be transmitted, communication device timers for unacknowledged data packets are unnecessary. Communication devices without such timers retransmit data packets only when corresponding ACKs have not been received and when the data controller indicates that the corresponding ACKs will not be sent. During high traffic periods when ACKs are delayed, such communication devices will not flood the data controller with data packets retransmitted due to premature timer expirations. Thus, with the present invention, data throughput is not diminished by unnecessary retransmissions in contrast to timer-based protocols.

When data traffic is very light, communication devices employing the present invention will not have timers which must expire before retransmitting lost data packets. Instead, the communication devices will wait only for an indication from the data controller that ACKs corresponding to the lost data packets will no longer be sent. The data controller transmits such indications as soon as the traffic level permits. Thus, with the present invention, lost data packets are retransmitted as soon as possible, minimizing data delay.

Figure 2:
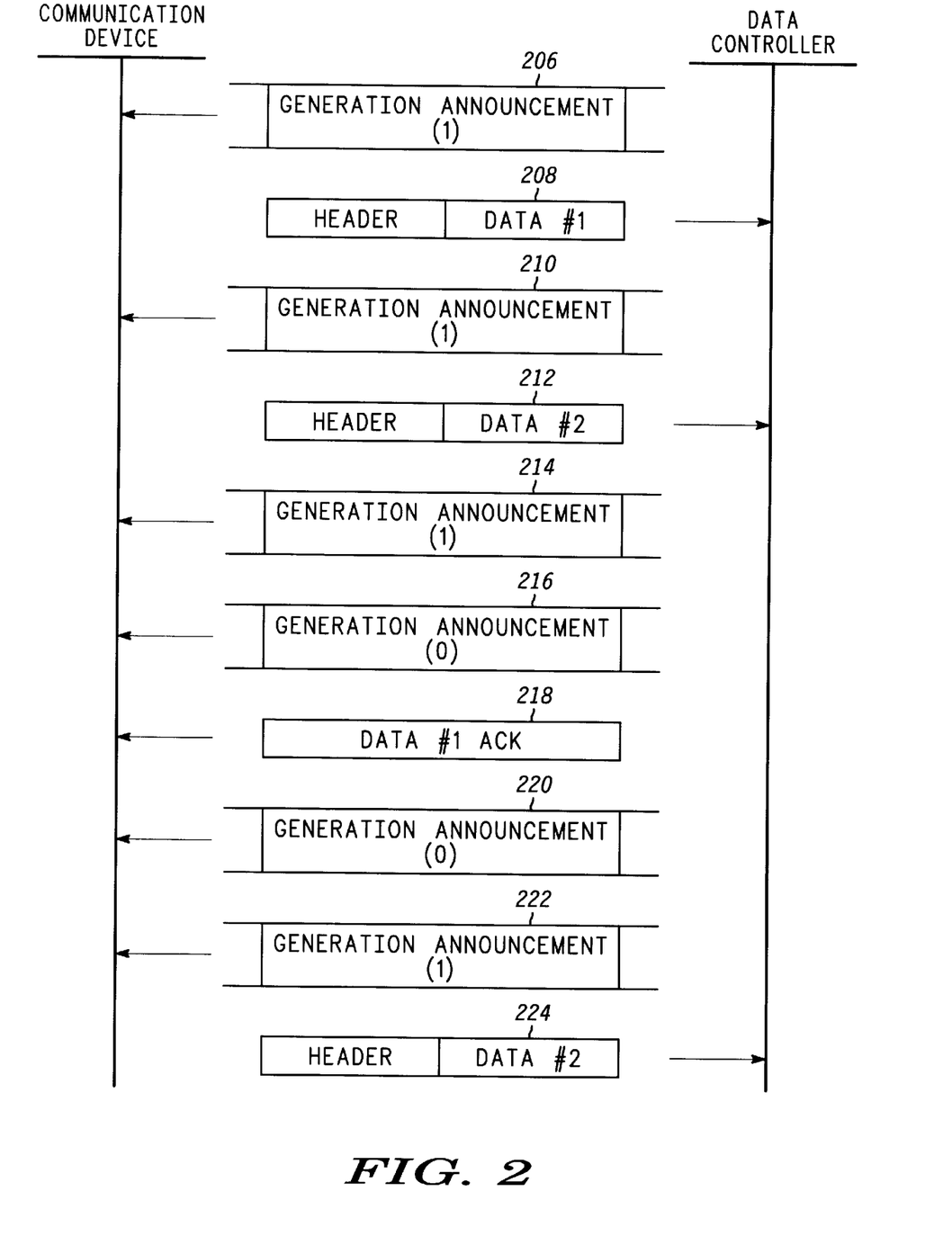
FIG. 2 illustrates a block diagram depiction of messages exchange between a communication device and data controller in accordance with a first preferred embodiment of the present invention.

FIG. 2 illustrates a block diagram depiction of messages exchanged by a communication device and a data controller in accordance with a first preferred embodiment of the present invention. In the first preferred embodiment, the data controller periodically transmits a generation announcement that comprises one bit of control information. The one bit of control information resides within each SDB of each packet data TDMA time slot that is transmitted from the data controller. Each generation announcement explicitly indicates the generation of transmitted data packets that the data controller is currently acknowledging (i.e., the outbound generation) and implicitly the generation of newly transmitted data packets (i.e., the inbound generation). In FIG. 2, the communication device receives a generation announcement 206 from the data controller which indicates that the current outbound generation is one (1). The generation announcement 206 also indicates the current inbound generation or transmission time period for communication device transmissions. In the first preferred embodiment, the inbound generation is defined to be the logical NOT or the opposite of the outbound generation. Thus, generation announcement 206 indicates that the current outbound generation is one (1) and the current inbound generation is zero (0).

The communication device transmits a data packet 208 to the data controller. It is noted that data packet 208 is not transmitted in response to generation announcement 206. Generation announcements do not indicate when transmissions must occur. The data packet 208 preferably includes a header portion and a data portion. The header portion preferably comprises control information related to the data packet and the overall data transmission. The data portion preferably comprises user data and one or more cyclic redundancy checks (CRCs) used by the data controller to determine whether the data packet was correctly received.

Upon transmitting data packet 208 to the data controller, the communication device receives the next generation announcement 210 from the data controller. Generation announcement 210 indicates that the outbound generation is still one and the inbound generation is still zero. From generation announcement 206, received immediately prior to transmitting data packet 208, the communication device knows that data packet 208 was transmitted in transmission time period or generation zero. The rule for determining the generation of a transmitted data packet could alternatively involve a generation announcement received after the data packet transmission. In such an embodiment, generation announcement 210 might instead be used to determine the generation of data packet 208.

Upon receiving generation announcement 210, the communication device transmits data packet 212 to the data controller. Data packet 212 includes the same type of header control information as data packet 208, but different user data. From generation announcement 210, the communication device knows that data packet 212 was transmitted in generation zero.

In addition to the messages shown in FIG. 2 between the communication device and the data controller, the data controller is receiving and acknowledging data packets transmitted by other communication devices. During a particular inbound generation the data controller receives a group of data packets. In the first preferred embodiment, the data controller transmits generation announcements indicating the inbound generation of the group of data packets still being acknowledged. For example, the data controller transmits generation announcement 214 announcing the outbound generation to be one and indicating that the group of data packets from generation one are still being acknowledged. Upon acknowledging the last data packet (not shown) from the generation one group of data packets, the data controller determines the earliest transmission time period or generation of a group of data packets to be acknowledged. With only two generations possible due to using a single bit generation announcement and the last ACK for generation one transmitted, the data controller determines that the group of data packets from generation zero is now the earliest generation to be acknowledged. Thus, the data controller transmits generation announcement 216 (a zero bit) announcing that generation zero is now being acknowledged and that no data packets from the generation one group of data packets remain to be acknowledged.

One of the ACKs transmitted by the data controller during outbound generation zero is ACK 218 acknowledging data packet 208. Upon receiving ACK 218, the communication device considers data packet 208 successfully transferred to the data controller. As the data controller continues transmitting ACKs (not shown) for the group of data packets from generation zero, the data controller transmits generation announcement 220 indicating that data packets transmitted during generation zero are still being acknowledged.

Upon acknowledging the last data packet (not shown) from the generation zero group of data packets, the data controller transmits generation announcement 222. The communication device receives generation announcement 222 and detects a change in the one bit of control information (i.e., outbound generation) from zero to one. The change indicates that only data packets transmitted after generation zero (i.e., generation one data packets) will be acknowledged. Since the communication device has not received an ACK for data packet 212 and the communication device transmitted data packet 212 during generation zero, the communication device retransmits a portion of data packet 212 to the data controller. The user data portion of data packet 212 is retransmitted to the data controller as the user data portion of data packet 224. In the above manner, unacknowledged user data is retransmitted by the communication device without having to rely on a timer expiration.

Figure 3:
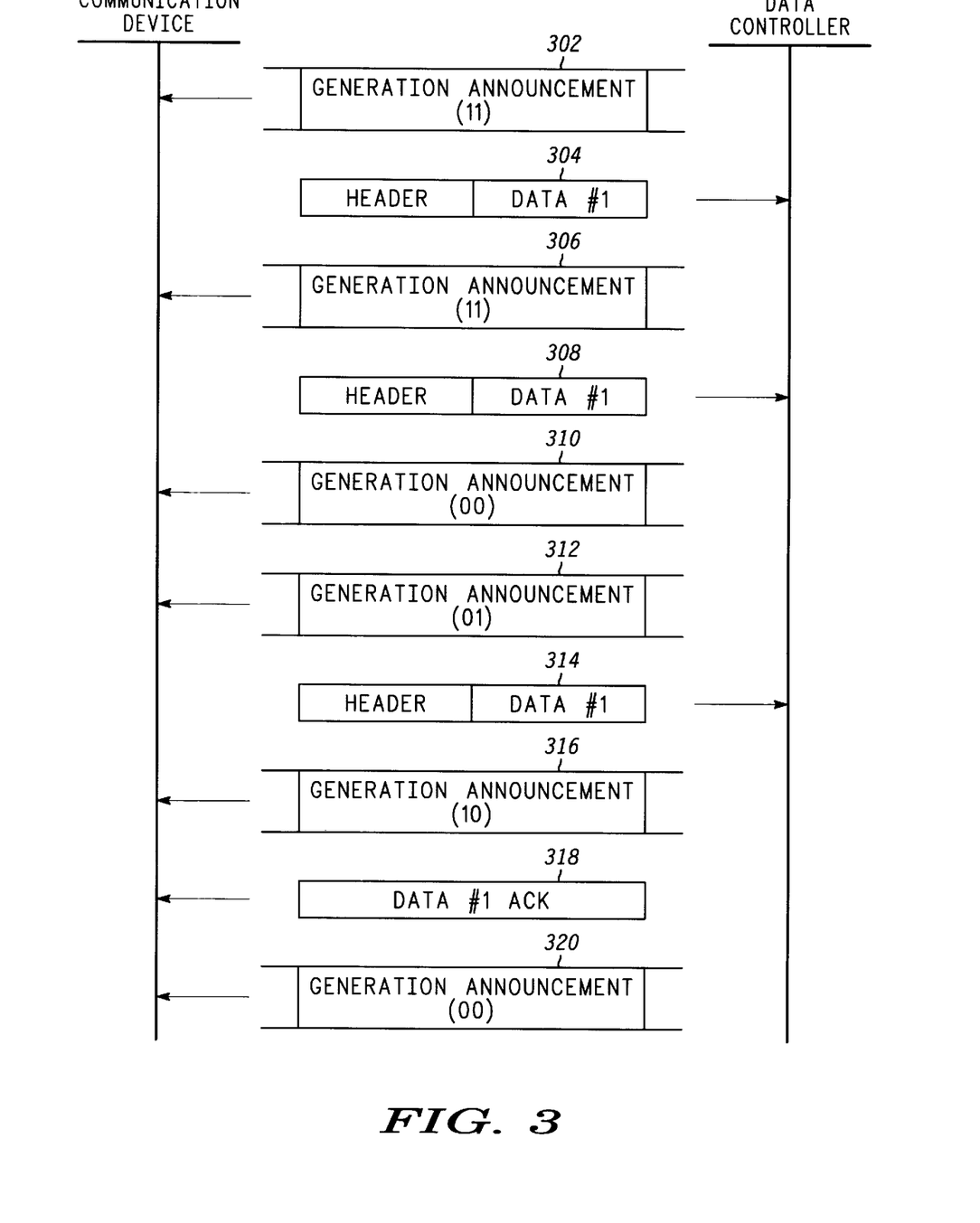
FIG. 3 illustrates a block diagram depiction of messages exchanged between a communication device and data controller in accordance with a second preferred embodiment of the present invention.

FIG. 3 illustrates a block diagram depiction of messages exchanged by a communication device and data controller in accordance with a second preferred embodiment of the present invention. In the second preferred embodiment, two bits of control information are transmitted by the data controller for each generation announcement. With two bits, four control information values are possible: 00, 01, 10, and 11. The data controller transmits a generation announcement with value 11 to indicate to all receiving communication devices that the data controller has received no data packets which have not already been acknowledged. The other three values, 00, 01, and 10, indicate the current outbound generation.

The data controller transmits generation announcement 302 indicating that there are no outstanding ACKs for the data controller to transmit. With some user data to transfer to the data controller, the communication device transmits data packet 304 to the data controller. Upon receiving generation announcement 306, the communication device determines that the data controller did not receive data packet 304, since generation announcement 306 indicates that the data controller has no ACKs to transmit. The communication device then retransmits the user data portion of data packet 304 as the user data portion of data packet 308.

When the data controller is transmitting generation announcements with the value of 11, in the second preferred embodiment, the current inbound generation is defined to be 00. From generation announcement 306, the communication device determines that data packet 308 is part of inbound generation 00. As discussed above with regard to the first preferred embodiment, the inbound generation of a transmitted data packet may alternatively be determined by using a generation announcement received after the data packet transmission rather than before the generation announcement.

The data controller transmits generation announcement 310 indicating that a group of data packets received during inbound generation 00 are being acknowledged. Generation announcement 310 announces to all receiving communication devices that the current outbound generation is 00. In the second preferred embodiment, the current inbound generation is the next generation following the current outbound generation in the repeating sequence of generations (i.e., 00, 01, and 10). For example, if the current outbound generation being announced was 10, the current inbound generation would be 00. Since the current outbound generation is 00, the current inbound generation is 01.

Upon transmitting the last ACK (not shown) for inbound generation 00 data packets, the data controller transmits generation announcement 312. Generation announcement 312 announces the new outbound generation to be 01, indicating that the data controller has ACKs to transmit for inbound generation 01 data packets (not shown) and implicitly indicating the new inbound generation is 10.

The communication device determines that generation announcement 312 also indicates that only data packets transmitted after inbound generation 00 will be acknowledged. The communication device makes such a determination by detecting the change in the two bits of control information between generation announcements 310 and 312 (i.e., the change from 00 to 01). Since data packet 308 was transmitted during inbound generation 00 and the communication device has not received an ACK for data packet 308, the communication device retransmits to the data controller the user data portion of data packet 308 as the user data portion of data packet 314. From generation announcement 312, the inbound generation of data packet 314 is determined to be 10.

Upon transmitting the last ACK (not shown) for inbound generation 01 data packets, the data controller transmits generation announcement 316. Generation announcement 316 announces the new outbound generation to be 10, indicating that the data controller has ACKs to transmit for inbound generation 01 data packets. One such ACK 318 is transmitted by the data controller for data packet 314. The data controller, upon transmitting the last ACK for inbound generation 10 data packets, transmits generation announcement 320 indicating that the data controller has ACKs to transmit for inbound generation 00 data packets (not shown). In the second preferred embodiment, the data controller continues cycling through generations 00, 01, and 10 until the data controller has acknowledged all data packets received. Upon acknowledging all data packets received, the data controller again transmits generation announcements with the value 11 to indicate that no acknowledgments are outstanding.

The ability to transmit a single generation announcement which indicates that no acknowledgments are outstanding is an advantage that the second preferred embodiment offers over the first preferred embodiment. When there are no ACKs outstanding in the first preferred embodiment, generation announcements alternate between zero and one. A communication device which transmits a data packet which is not received by a data controller must retransmit the user data within the data packet. The sooner the user data is retransmitted the less delay the user data experiences.

In the first preferred embodiment, the communication device must receive at least three generation announcements to determine that the user data must be retransmitted. First, the communication device must receive a generation announcement to determine the inbound generation of the transmitted data packet. For the purpose of illustration, the inbound generation will be zero. The communication device must then receive generation announcements indicating that the outbound generation is zero and that the outbound generation is one again. Upon receiving all three generation announcements the user data can be retransmitted. If a generation announcement is missed, more than three generation announcements may be necessary, further delaying the user data.

In the second preferred embodiment, when the communication device receives a generation announcement with the value 11, the communication device knows immediately that any unacknowledged data must be retransmitted. The quicker retransmissions of the second preferred embodiment are achieved by the trade-off of adding an extra bit to the generation announcements of the first preferred embodiment. Every generation announcement in the second preferred embodiment requires the transmission of two bits, rather than one. Thus, in the second preferred embodiment, communication bandwidth is sacrificed for reduced data delays and potentially higher throughput.

Figure 4:
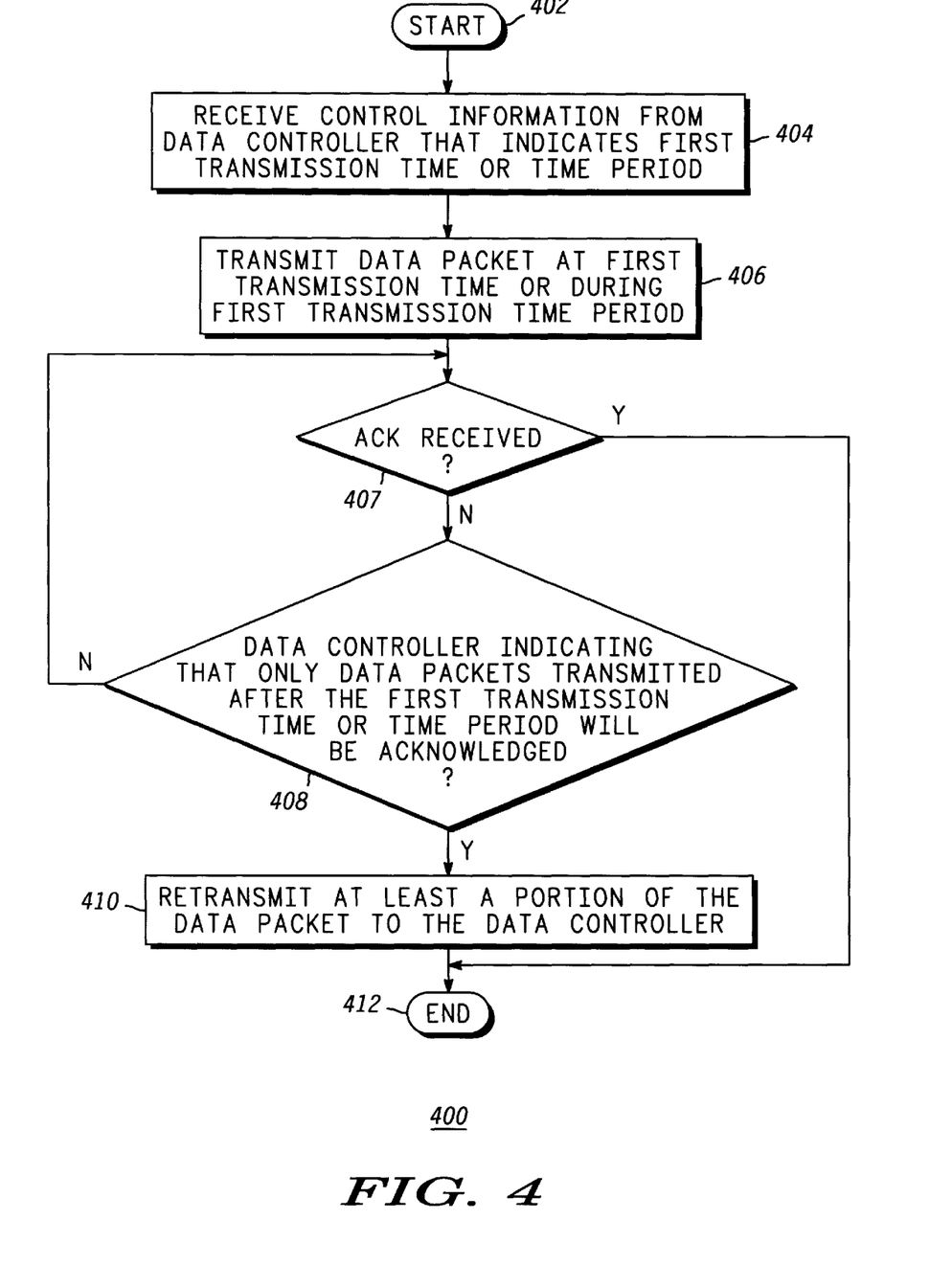
FIG. 4 illustrates a logic flow diagram of steps executed by a communication device in accordance with the present invention.

FIG. 4 illustrates a logic flow diagram 400 of steps executed by a communication device in accordance with the present invention. The logic flow begins (402) when the communication device receives (404) control information from a data controller that indicates a transmission time or time period. Upon receiving the control information, the communication device transmits (406) a data packet. The data controller and communication device consider the data packet to have been transmitted at the transmission time or during the transmission time period indicated in the control information. As discussed above with respect to FIG. 2, the communication device could alternatively transmit (406) the data packet before receiving (404) control information from a data controller that indicates the transmission time or time period. In another embodiment in which the communication device and the data controller include a shared time reference, the communication device could transmit (406) the data packet without receiving (404) control information from the data controller.

By monitoring the messaging received from the data controller, the communication device determines (407) whether an ACK has been received from the data controller for the data packet. If an ACK has been received, the logic flow ends (412). If an ACK has not been received for the data packet, the communication device, by monitoring the control information periodically received from the data controller, determines (408) whether the data controller is indicating that only data packets transmitted after the transmission time or time period will be acknowledged. When the control information does not indicate that only data packets transmitted after the transmission time or time period will be acknowledged, the communication device returns to determining (407) whether an ACK has been received for the data packet. When the control information indicates that only data packets transmitted after the transmission time or time period will be acknowledged, the communication device retransmits (410) at least the user data portion of the data packet to the data controller and the logic flow ends (412).

Figure 5:
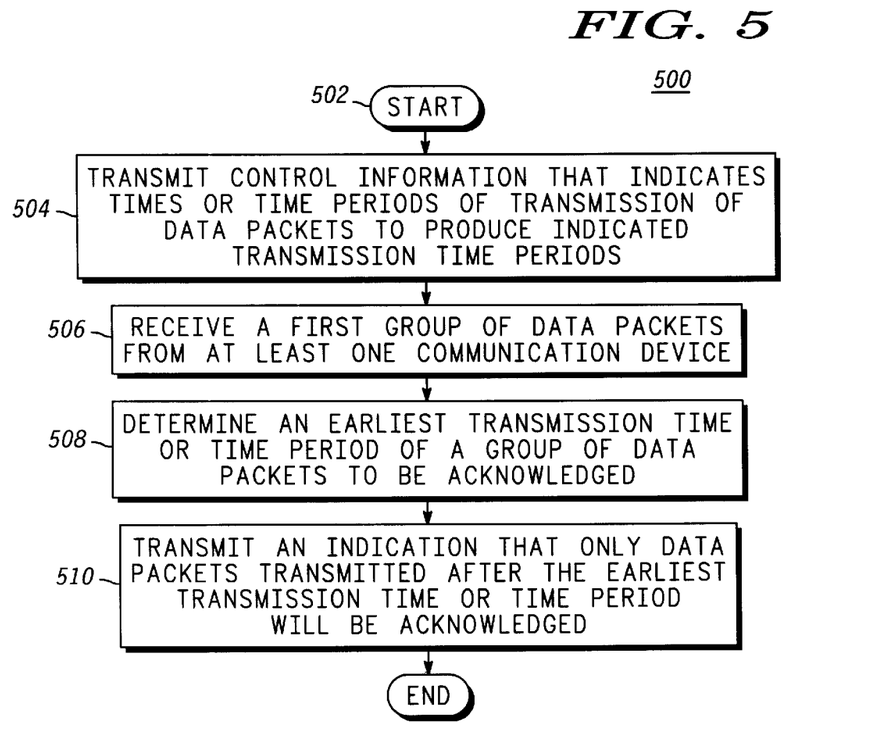
FIG. 5 illustrates a logic flow diagram of steps executed by a data controller in accordance with the present invention.

FIG. 5 illustrates a logic flow diagram 500 of steps executed by a data controller in accordance with a preferred embodiment of the present invention. The logic flow begins (502) when the data controller transmits (504) control information that indicates transmission time or time periods of data packets. In the embodiment in which the control information includes transmission time, both the data controller and the communication device include a shared time reference (e.g., a global positioning satellite (GPS) receiver). In the embodiment in which the control information includes transmission time period, the control information transmitted preferably takes the form of generation announcements that periodically announce the current outbound generation. The current inbound generation is then determined at the receiving communication device, as discussed above, by using the explicitly announced outbound generation. Alternatively, the control information transmitted by the data controller could, announce explicitly both the current outbound and inbound generations.

The data controller receives (506) a group of data packets from one or more communication devices. All data packets of the group were transmitted during one of the indicated transmission time periods or at their indicated transmission times. The data controller then determines (508) the earliest transmission time or time period at or during which the data controller had received a group of data packets to be acknowledged. Preferably, the data controller first acknowledges the group of data packets received during the earliest transmission time period or at the earliest transmission time. Upon completing all such acknowledgments, the data controller transmits (510) an indication that only data packets received after the earliest transmission time or time period will be acknowledged. In a preferred embodiment, the data controller makes the indication by changing the value of the generation announcements transmitted. Thus, the communication devices are notified that certain data packets will no longer be acknowledged and the user data contained in the unacknowledged data packets may need to be retransmitted.

The preferred embodiments of the present invention involve the transmission of generation announcements to indicate periods of time in which data packet and acknowledgment transmissions take place. In an alternate embodiment, specific transmission times may replace transmission time periods. In such an embodiment, as alluded to above, the data controller transmits control information indicating transmission times rather than time periods. Each data packet transmitted by a communication device has a specific transmission time rather than a transmission time period. The data controller determines the earliest transmission time of data packets to be acknowledged and transmits an indication that only data packets transmitted after the earliest transmission time will be acknowledged. Each communication device then compares the transmission time of each unacknowledged data packet to the earliest transmission time. In this manner, a particular communication device determines whether the data controller is indicating that only data packets transmitted after the transmission time of a particular unacknowledged data packet will be acknowledged. Finally, when the data controller is indicating such, the particular communication device retransmits at least a portion of the particular unacknowledged data packet.

The present invention encompasses a method and apparatus for conveying data packets in a communication system. With this invention, reliable data communication is achieved without using communication device timers for unacknowledged data packets. A data controller transmits an indication that only data packets transmitted after a certain time or time period will be acknowledged. Communication devices use this indication, rather than timer expirations, to determine whether or not to retransmit information to the data controller. Eliminating timers avoids the problems such timers can cause, such as reduced data throughput and increased data delay.

While the present invention has been particularly shown and described with reference to particular embodiments thereof, it will be understood by those skilled in the art that various changes in form and details may be made therein without departing from the spirit and scope of the present invention.

We claim:

1. A method for a communication device to convey data packets to a data controller, the method comprising the steps of:

transmitting a data packet at a first transmission time to the data controller;

determining whether the data controller is indicating that only data packets transmitted after the first transmission time will be acknowledged; and when the data controller is indicating that only data packets transmitted after the first transmission time will be acknowledged, retransmitting at least a portion of the data packet to the data controller.

2. The method of claim 1, wherein the data packet includes control information.

3. The method of claim 1, wherein the data packet includes user data.

4. The method of claim 1, further comprising the step of receiving control information from the data controller that indicates the first transmission time of the data packet.

5. The method of claim 1, wherein the step of determining whether the data controller is indicating that only data packets transmitted after the first transmission time will be acknowledged comprises the steps of:

receiving control information from the data controller indicating an earliest transmission time of a data packet that will be acknowledged; and comparing the earliest transmission time to the first transmission time.

6. A method for a data controller to facilitate a conveyance of data packets from at least one communication device, the method comprising the steps of:

determining a transmission time of a data packet to be acknowledged; and transmitting an indication that only data packets transmitted after the transmission time and received by the data controller will be acknowledged.

7. A method for a communication device to convey data packets to a data controller, the method comprising the steps of:

transmitting a data packet during a first transmission time period to the data controller;

determining whether the data controller is indicating that only data packets transmitted after the first transmission time period will be acknowledged; and when the data controller is indicating that only data packets transmitted after the first transmission time period will be acknowledged, retransmitting at least a portion of the data packet to the data controller.

8. The method of claim 7, wherein the first transmission time period comprises a time period during which a first group of data packets are transmitted.

9. The method of claim 7, wherein the step of determining comprises the step of detecting at least one change in at least one bit of control information, the at least one change in the at least one bit of control information indicating that only data packets transmitted after the first transmission time period will be acknowledged.

10. The method of claim 9, wherein the step of detecting a change in at least one bit of control information comprises the step of detecting a plurality of changes in the at least one bit of control information.

11. The method of claim 9, wherein the data controller and the communication device communicate via a time division multiple access resource and wherein the control information resides in a portion of at least one time slot transmitted by the data controller.

12. The method of claim 7, further comprising the step of receiving control information from the data controller that indicates the first transmission time period.

13. A method for a data controller to facilitate a conveyance of data packets from at least one communication device, the method comprising the steps of:
   determining a transmission time period of a group of data packets to be acknowledged; and
   transmitting an indication that only data packets transmitted after the transmission time period will be acknowledged.

14. The method of claim 13, further comprising the step of receiving a group of data packets from the at least one communication device during the transmission time period.

15. The method of claim 13, further comprising the steps of:
   transmitting control information that indicates transmission time periods of data packets to produce indicated transmission time periods; and
   receiving a group of data packets from the at least one communication device, wherein each data packet of the group of data packets was transmitted during at least one of the indicated transmission time periods.

16. A data controller for facilitating a conveyance of data packets from at least one communication device, the data controller comprising:

a receiver that receives a group of data packets from the at least one communication device, the group of packets having been transmitted during a transmission time period;

a transmitter that, responsive to a control signal, transmits an indication that only data packets transmitted after the transmission time period will be acknowledged; and a processor, coupled to the receiver and the transmitter, that determines the transmission time period of a group of data packets to be acknowledged and provides the control signal to the transmitter instructing the transmitter to transmit the indication that only data packets transmitted after the transmission time period and received by the receiver will be acknowledged.

17. The data controller of claim 16, wherein the indication comprises a sequence of control information values.

18. The data controller of claim 17, wherein each control information value comprises at least one bit and resides in a portion of a time division multiple access time slot.

19. A communication device for conveying data packets, the communication device comprising:

a data source that provides data packets for transmission to a data controller;

a transmitter, coupled to the data source, that transmits a data packet during a transmission time period to the data controller and, responsive to a control signal, retransmits at least a portion of the data packet to the data controller;

a receiver that receives from the data controller data packet acknowledgments and an indication of which data packets will be acknowledged; and a processor, coupled to the data source, the transmitter, and the receiver, that determines, based on the indication, whether the data controller is indicating that only data packets transmitted after the transmission time period will be acknowledged and, when the data controller is indicating that only data packets transmitted after the transmission time period will be acknowledged and the receiver has not received an acknowledgment pertaining to the data packet, provides the control signal to the transmitter instructing the transmitter to retransmit the at least a portion of the data packet to the data controller.

* * * * *